US006628499B1

(12) United States Patent
Kim

(10) Patent No.: US 6,628,499 B1
(45) Date of Patent: Sep. 30, 2003

(54) CHARGING APPARATUS OF PRINTER

(75) Inventor: Min-seon Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 510 days.

(21) Appl. No.: 09/675,670

(22) Filed: Sep. 29, 2000

(30) Foreign Application Priority Data

Dec. 30, 1999 (KR) ........................................... 99-65984

(51) Int. Cl.[7] ................................................ H02H 3/00
(52) U.S. Cl. ....................... 361/225; 361/212; 361/220; 361/235
(58) Field of Search ................................ 347/129, 128; 361/225, 212, 220, 235

(56) References Cited

U.S. PATENT DOCUMENTS 5,272,507 A * 12/1993 Yoshida et al. ............. 399/171
5,287,146 A * 2/1994 Uno et al. .................... 399/89

* cited by examiner

*Primary Examiner*—Stephen W. Jackson
(74) *Attorney, Agent, or Firm*—Sughrue Mion, PLLC

(57) ABSTRACT

A charging apparatus of a printer for charging a photoreceptor medium to a predetermined electric potential which includes a first electrode and a second electrode separated a predetermined distance from the first electrode and facing the photoreceptor medium, the charging apparatus includes a high voltage generating unit for generating a voltage set to the first electrode, a first varister connected to one end of the second electrode, a second varister having one end connected to the first varister in parallel and the other end connected to a ground terminal, a switching unit connected to the second varister in parallel and switched on/off, and an engine controller for controlling a duty of switching on/off of the switching unit to control a voltage maintained at the second electrode. Thus, the structure of a circuit is simplified and the size of the printer can be reduced.

10 Claims, 4 Drawing Sheets

CHARGING APPARATUS OF PRINTER

BACKGROUND OF THE INVENTION

1. Field of the Invention

The present invention relates to a charging apparatus of a printer, and more particularly, to a printer charging apparatus having a simplified voltage generating circuit for charging a photoreceptor medium to a predetermined electric potential.

2. Description of the Related Art

FIG. 1 is a view showing the structure of a typical liquid type electrophotographic color printer. Referring to the drawing, the printer includes a photoreceptor web 11, a discharger 12, a charging apparatus 20, a surface electric potential sensor 13, a plurality of laser scanning units 14, a plurality of developing units 15, a drying unit 16, and a transfer unit 17.

The developing units 15 supply developer for yellow (Y), magenta (M), cyan (C) and black (K) to the photoreceptor web 11 to develop an electrostatic latent image formed by the corresponding laser scanning units 14. The drying unit 16 removes a liquid carrier component remaining on the photoreceptor web 11. The transfer unit 17 transfers a toner image formed on the photoreceptor web 11 to a sheet of paper 18. The discharger 12 removes the electrostatic latent image remaining on the photoreceptor web 11 by emitting light onto the photoreceptor web 11. The surface electric potential sensor 13 detects the electric potential of the photoreceptor web 11.

The charging apparatus 20 charges the photoreceptor web 11 to a predetermined electric potential so that a new electrostatic latent image can be written on the photoreceptor web 11. The charging apparatus 20 includes a first electrode 21 and a second electrode 31 which are separated from each other. The first electrode 21 is typically referred to as a corona electrode and the second electrode 31 is referred to as a grid electrode.

To charge the photoreceptor web 11 in an electromagnetic induction method, the second electrode 31 maintains an electric potential level of the photoreceptor web 11 to be charged or an electric potential slightly greater than the electric potential level of the photoreceptor web 11 to be charged. An electric potential level much greater than that of the second electrode 31 is applied to the first electrode 21. For example, when it is desired that the photoreceptor web 11 be charged to 600 volts, the first electrode 21 is maintained at 5 through 6 kilo-volts while the second electrode 31 is maintained at 600 through 800 volts.

Referring to FIG. 2, the conventional charging apparatus 20 includes a first high voltage generating unit 25 for generating a high voltage to the first electrode 21 and a second high voltage generating unit 35 for generating the second high voltage lower than that of the first electrode 21 to the second electrode 31.

An engine controller 40 outputs information on the voltage level to be generated by the first and second high voltage generating units 25 and 35, to the first and second high voltage generating units 25 and 35. The first high voltage generating unit 25 includes a first PWM (pulse width modulation) controlling portion 22, a first switch 23, and a first transforming portion 24. The second high voltage generating unit 35 includes a second PWM (pulse width modulation) controlling portion 32, a second switch 33, and a second transforming portion 34. Here, voltage generating processes of the first and second high voltage generating units 25 and 35 are the same. The voltage generating process of the first high voltage generating unit 25 is described as follows.

When the engine controller 40 outputs information on a target voltage to be maintained at the first electrode 21 to the first PWM controlling portion 22, the first PWM controlling portion 22 controls the first switch 23 to be turned on/off at a duty set corresponding to the target voltage. Here, the duty signifies a ratio of the time the first switch 23 is turned on during a set period.

When the first switch 23 is turned on/off at a set duty, a voltage increased as much as a coil turn ratio is induced by the first transforming portion 24. The induced voltage is rectified by a capacitor. The voltage rectified by the smoothing capacitor varies depending upon the duty.

The second high voltage generating unit 35 generates a voltage of the second electrode 31 in the same way as that in the first high voltage generating unit 25. However, since the conventional charging apparatus 20 adopts the two high voltage generating units 25 and 35 having different voltage levels to be generated, the structure of the printer is complicated.

SUMMARY OF THE INVENTION

To solve the above problem, it is an object of the present invention to provide a charging apparatus of a printer in which the structure of a circuit for charging the photoreceptor web to a predetermined electric potential is made simple.

Accordingly, to achieve the above object, there is provided a charging apparatus of a printer for charging a photoreceptor medium to a predetermined electric potential which includes a first electrode and a second electrode installed to be separated a predetermined distance from the first electrode and to face the photoreceptor medium, in which the charging apparatus comprises a high voltage generating unit for generating a voltage provided to the first electrode, a first varister connected to one end of the second electrode, a second varister having one end connected to the first varister in parallel and the other end connected to a ground terminal, a switching unit connected to the second varister in parallel, and an engine controller for controlling a switching operation of the switching unit to control a voltage maintained at the second electrode.

Also, to achieve the above object, there is provided a charging apparatus of a printer for charging a photoreceptor medium to a predetermined electric potential which includes a first electrode and a second electrode installed to be separated a predetermined distance from the first electrode and to face the photoreceptor medium, in which the charging apparatus comprises a high voltage generating unit for generating a voltage provided to the first electrode, a varister having one end connected to one end of the second electrode, a capacitor having one end connected to the other end of the varister and the other end connected to a ground terminal, a switching unit connected to the capacitor in parallel, and an engine controller for controlling a switching operation of the switching unit to control a voltage maintained at the second electrode.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
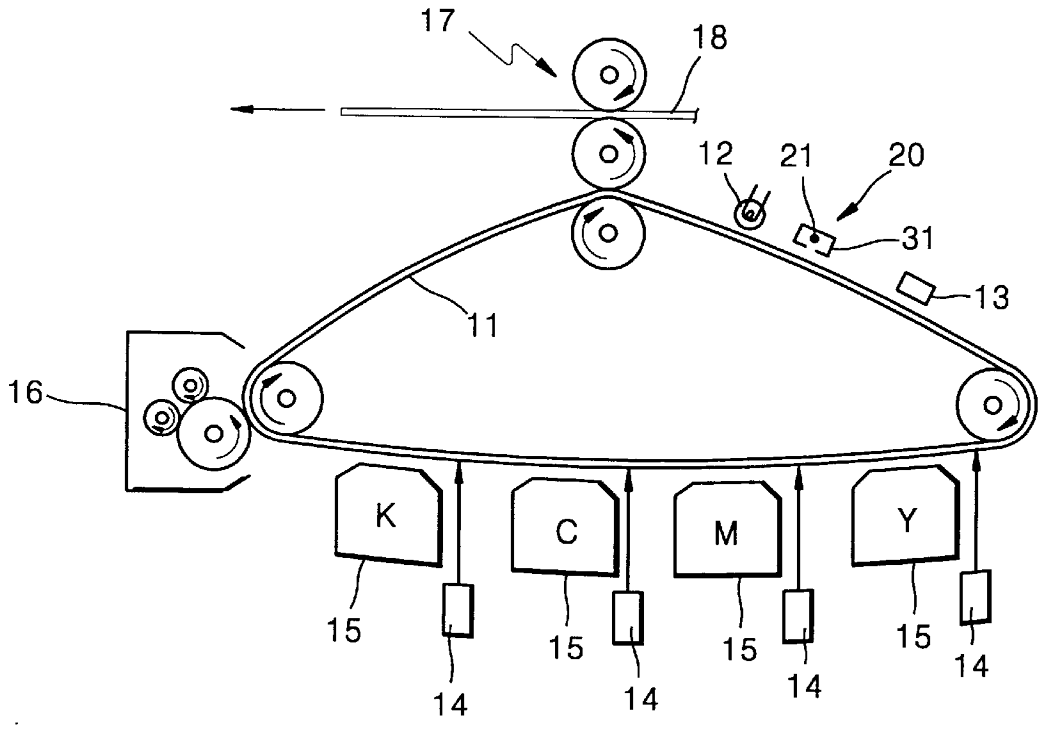
FIG. 1 (PRIOR ART)
FIG. 1 is a view illustrating the structure of a conventional liquid type electrophotographic color printer.
Figure 2:
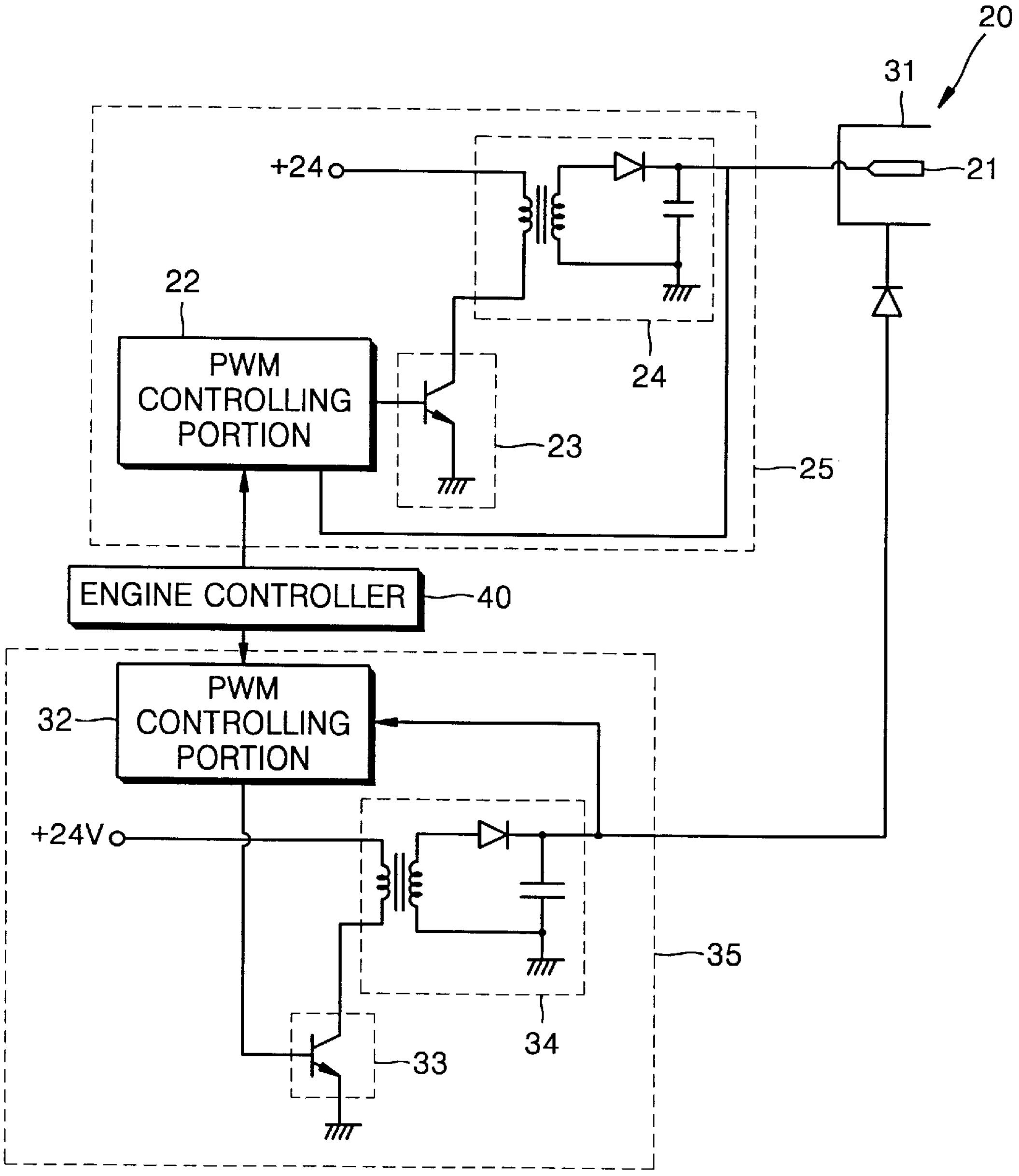
FIG. 2 (PRIOR ART)
FIG. 2 is a circuit diagram of a conventional charging apparatus.
Figure 3:
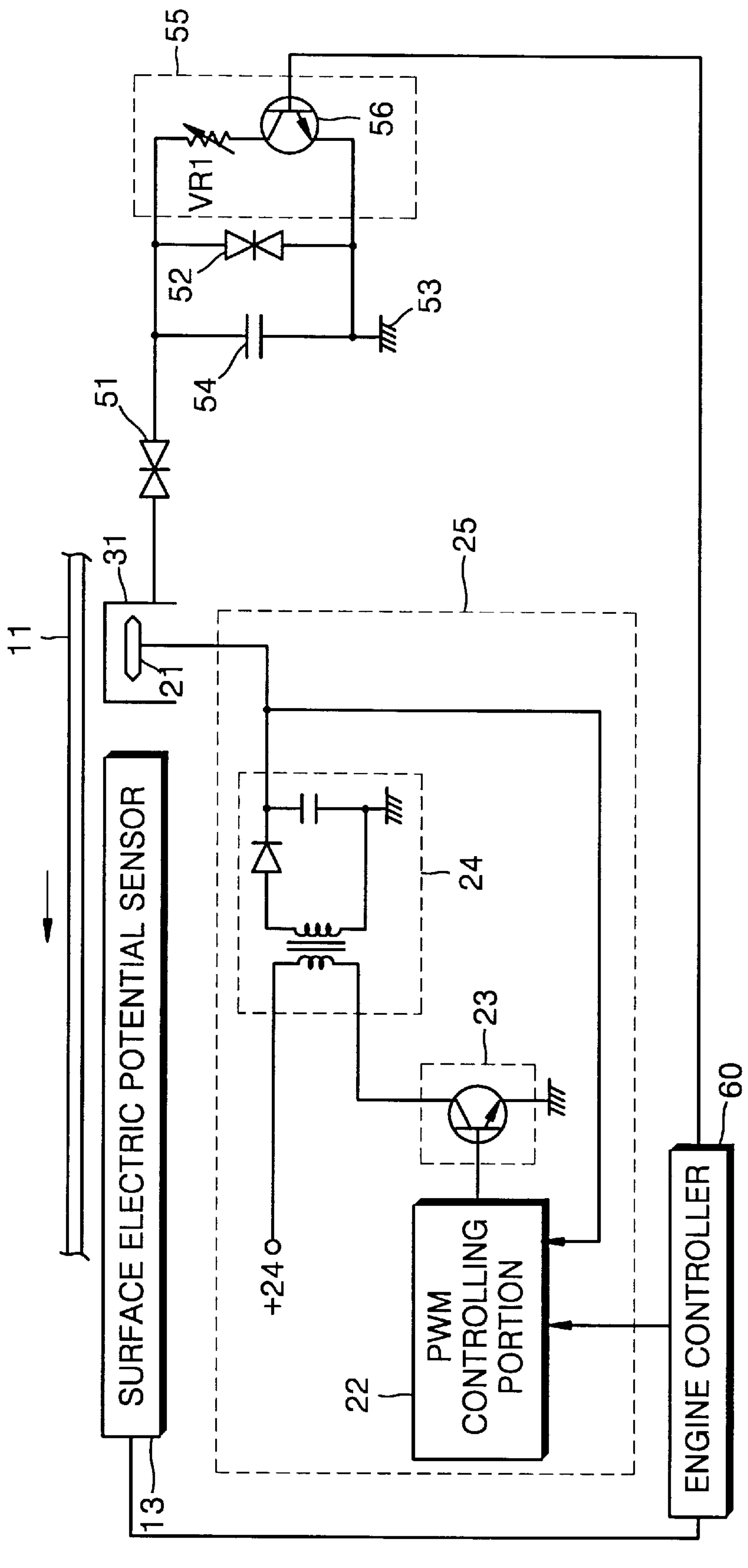
FIG. 3 is a circuit diagram of a charging apparatus of a printer according to a preferred embodiment of the present invention.

FIG. 3 is a circuit diagram of a charging apparatus of a printer according to a preferred embodiment of the present invention. Here, the same reference numerals as those shown in the previous drawings denote the same elements having the same functions.

Referring to the drawing, a charging apparatus according to a preferred embodiment of the present invention includes the first electrode 21, the second electrode 31, a high voltage generating unit 25, a first varister 51, a second varister 52, a switching unit 55 and an engine controller 60.

The high voltage generating unit 25 includes the PWM controlling portion 22, the first switch 23 and the transforming portion 24. The high voltage generating unit 25 is installed independent of the engine controller 60 so that the first electrode 21 may be configured to maintain an internally set target voltage. Preferably, considering the case in which the target voltage value to be maintained at the first electrode 21 needs to be altered corresponding to wearing out of the photoreceptor web 11, the high voltage generating unit 25 controls the voltage of the first electrode 21 by receiving a voltage generation target value for the first electrode 21 from the engine controller 60.

The first and second varisters 51 and 52 are connected in series between the second electrode 31 and a ground terminal 53. A capacitor 54 is connected in parallel to the second varister 52.

The switching unit 55 includes a variable resistor VR1 having one end connected to the second varister 52, and a second switch 56 connected between the other end of the variable resistor VR1 and the ground terminal 53 which is switched on/off by the engine controller 60. The variable resistor VR1 controls a variation range of duty allowance of the second switch 56. Thus, the resistance of the variable resistor VR1 is fixed according to the set duty allowance range of the second switch 56.

The first and second varisters 51 and 52 are devices each of which resistance varies according to an applied voltage. Utilizing the above feature, a device capable of dropping a voltage corresponding to the minimum value in a desired voltage variation range of the second electrode 31 is preferably adopted as the first varister 51. Also, a device capable of dropping a voltage corresponding to the voltage variation range of the second electrode 31 is preferably adopted as the second varister 52. For example, when the second electrode 51 is desired to vary between 600–800 volts, a device having a capacity of 600 volts and a device having a capacity of 200 volts are adopted as the first varister 51 and the second varister 52, respectively.

The engine controller 60 sets target voltage to be maintained at the first and second electrodes 21 and 31 and controls the high voltage generating unit 25 and the switching unit 55 to maintain the set target voltage values. The engine controller 60 receives information on the surface electric potential of the photoreceptor web 11 detected by the surface electric potential sensor 13 and controls the high voltage generating unit 25 and the switching unit 55 to maintain a set target electric potential level of the photoreceptor web 11. When the photoreceptor web 11 wears out, impedance of the photoreceptor web 11 increases and a charged electric potential value of the photoreceptor web 11 induced by the second electrode 31 decreases. Thus, the engine controller 60 receives surface electric potential level information of the photoreceptor web 11 provided by the surface electric potential sensor 13 and increases the target voltage values of the first and second electrodes 21 and 31 when the charged electric potential of the photoreceptor web 11 decreases.

A voltage generating process of the second electrode 31 in the case in which devices having capacities of 600 volts and 200 volts are respectively adopted as the first and second varisters 51 and 52 is described as follows.

When the high voltage generating unit 25 generates a voltage to the first electrode 21 to be maintained at a target voltage level, for example, 6 kilovolts, a predetermined electric potential is induced by electromagnetic induction from the voltage maintained in the first electrode 21. Here, when the first switch 56 is turned off, current flows through the first varister 51 and the second varister 52 by the electric potential induced to the first electrode 21. In this process, when the voltage induced to the second electrode 31 instantaneously exceeds 800 volts, since the resistance of the first and second varisters 51 and 52 corresponding to the voltage are very low, the amount of current flowing through the varisters 51 and 52 increases. As a result, the voltage induced to the second electrode 31 decreases. While the voltage induced to the second electrode 31 decreases, the resistance of the first and second varisters 51 and 52 increase. Finally, the second electrode 31 maintains a voltage of 800 volts.

When the voltage level of the first electrode 21 is desired to be lowered under 800 volts, the second switch 56 is controlled to be turned on/off with a predetermined duty. When the second switch 56 is turned on, since average impedance is reduced than when the second switch 56 is turned off, the voltage to be maintained at the second electrode 31 is lowered.

Figure 4:
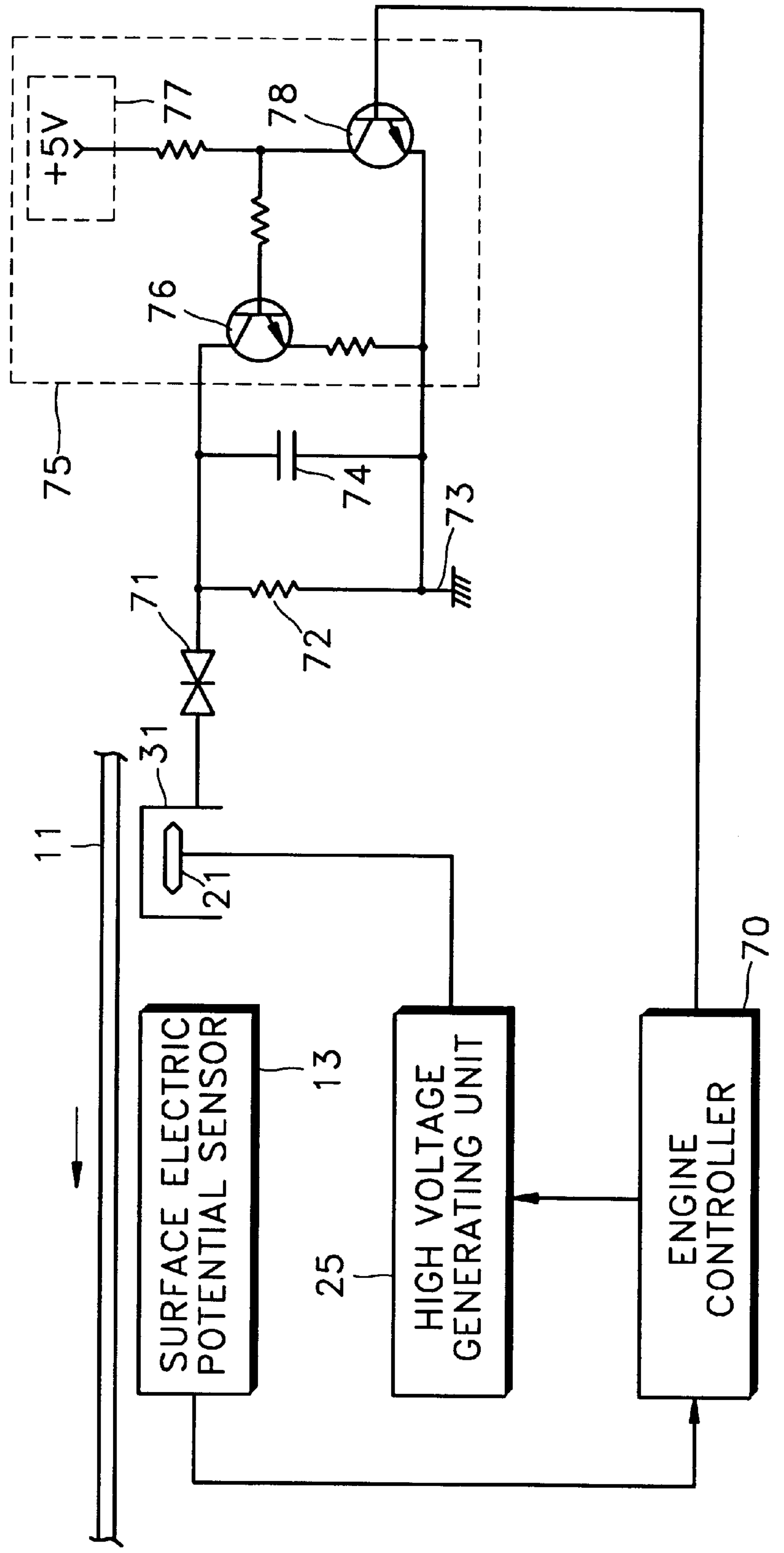
FIG. 4 is a circuit diagram of a charging apparatus of a printer according to another preferred embodiment of the present invention.

FIG. 4 is a circuit diagram showing a charging apparatus of a printer according to another preferred embodiment of the present invention. Here, the same reference numerals as those shown in FIG. 3 denote the same elements having the same functions.

Referring to the drawing, a charging apparatus according to another preferred embodiment of the present invention includes the first electrode 21, the second electrode 31, the high voltage generating unit 25, a first varister 71, a capacitor 74, and a switching portion 75. The first varister 71 and the capacitor 74 are connected in series between the second electrode 31 and a ground terminal 73. A resistor 72 for discharging is connected in parallel to the capacitor 74. The switching unit 75 is connected in parallel to the capacitor 74.

The switching unit 75 includes a second switch 76, an electric power 77, and a third switch 78. The second switch 76 has a collector connected to the varister 71 connecting to the capacitor 74 and an emitter connected to the ground terminal 73 via a fixed resistor. The electric power 77 is connected to a base of the second switch 76 via resistors. The third switch 78 has a collector connected to the electric power 77 and can control switching on/off of the second switch 76 according to a control signal of the engine controller 70.

Thus, when the third switch 78 is turned off, the second switch 76 maintains a turn-on state. Contrarily, when the third switch 78 is turned on, the second switch 76 maintains a turn-off state. Accordingly, the impedance of the elements connected to the second electrode 31 differs when the second switch 76 is turned on/off. Therefore, the engine controller 70 can adjust the duty of controlling switching on/off of the third switch 78 according to the difference in impedance so that a desired target voltage is maintained at the second electrode 31.

As described above, according to the charging apparatus of a printer according to the present invention, the structure of a circuit is simplified and the size of the printer can be reduced.

What is claimed is:

1. A charging apparatus of a printer for charging a photoreceptor medium to a predetermined electric potential, the charging apparatus comprising:

a first electrode disposed in a position facing the photoreceptor medium;

a second electrode disposed at a predetermined distance from the first electrode and facing the photoreceptor medium;

a high voltage generating unit for generating a voltage which is supplied to the first electrode;

a first varister connected to a first end of the second electrode;

a second varister having a first end connected to a second end of the first varister and a second end connected to a ground terminal;

a switching unit connected in parallel to the second varister; and an engine controller for controlling a switching operation of the switching unit to control a voltage maintained at the second electrode.

2. The apparatus as claimed in claim 1, wherein the high voltage generating unit receives information regarding a voltage to be maintained at the first electrode from the engine controller.

3. The apparatus as claimed in claim 1, wherein the switching unit comprises:

a variable resistor having a first end connected to the first end of the second varister; and a switch connected between a second end of the variable resistor and the ground terminal, wherein said switch is switched on and off by the engine controller.

4. The apparatus as claimed in claim 1, further comprising a capacitor connected in parallel to the second varister.

5. A charging apparatus of a printer for charging a photoreceptor medium to a predetermined electric potential, the charging apparatus comprising:

a first electrode disposed in a position facing the photoreceptor medium;

a second electrode disposed at a predetermined distance from the first electrode and facing the photoreceptor medium;

a high voltage generating unit for generating a voltage which is supplied to the first electrode;

a varister having a first end connected to a first end of the second electrode;

a capacitor having a first end connected to a second end of the varister and a second end connected to a ground terminal;

a switching unit connected in parallel to the capacitor; and an engine controller for controlling a switching operation of the switching unit to control a voltage maintained at the second electrode.

6. The apparatus as claimed in claim 5, wherein the high voltage generating unit receives information regarding a voltage to be maintained at the first electrode from the engine controller.

7. The apparatus as claimed in claim 5, wherein the switching unit comprises:

a first switch connected having a collector connected to the second end of the varister and an emitter connected to the ground terminal via a fixed resistor;

an electric potential source connected to a base of the first switch; and a second switch for controlling a switching operation of the first switch according to a control signal of the engine controller.

8. The apparatus as claimed in claim 5, further comprising a discharge resistor connected in parallel to the capacitor.

9. The apparatus as claimed in claim 1, wherein the engine controller controls a duty of the switching operation of the switching unit in accordance with a detected surface electric potential level of the photoreceptor medium to control the voltage maintained at the second electrode.

10. The apparatus as claimed in claim 5, wherein the engine controller controls a duty of the switching operation of the switching unit in accordance with a detected surface electric potential level of the photoreceptor medium to control the voltage maintained at the second electrode.

* * * * *